United States Patent [19]
Ogata

[11] Patent Number: 6,034,819
[45] Date of Patent: Mar. 7, 2000

[54] DIFFRACTIVE OPTICAL ELEMENT BOTH SURFACES OF WHICH COMPRISE DIFFRACTIVE SURFACES

[75] Inventor: Yasuji Ogata, Akiruno, Japan

[73] Assignee: Olympus Optical Co., Ltd., Tokyo, Japan

[21] Appl. No.: 08/921,266

[22] Filed: Aug. 29, 1997

[30]  Foreign Application Priority Data

Aug. 30, 1996  [JP]  Japan ................................. 8-229772

[51] Int. Cl.⁷ .............................. G02B 27/46; G02B 5/18
[52] U.S. Cl. ........................... 359/565; 359/558; 359/571
[58] Field of Search .................................. 359/565, 571, 359/9, 558

[56]  References Cited

U.S. PATENT DOCUMENTS

| | | | |
|---|---|---|---|
| 5,117,306 | 5/1992 | Cohen | 359/565 |
| 5,209,062 | 5/1993 | Ogata | 359/565 |
| 5,349,471 | 9/1994 | Morris et al. | 359/565 |
| 5,606,434 | 2/1997 | Feldman et al. | 359/569 |
| 5,629,799 | 5/1997 | Maruyama et al. | 359/565 |
| 5,748,372 | 5/1998 | Kitagawa | 359/571 |

FOREIGN PATENT DOCUMENTS

| | | | |
|---|---|---|---|
| 62-238502 | 10/1987 | Japan | 359/570 |
| 7/63982 | 3/1995 | Japan. | |
| WO93/20464 | 10/1993 | WIPO | 359/565 |
| WO 95/18393 | 7/1995 | WIPO. | |

OTHER PUBLICATIONS

G. J. Swanson, "Binary Optics Technology: The Theory and Design of Multi–Level Diffractive Optical Elements", Mass. Inst. Techn., Lincoln Laboratory, Technical Report 854, pp. 1–47, Lexington Massachusetts, Aug. 1989.

Thomas Stone and Nicholas George, Hybrid diffractive–refractive lenses and achromats, Applied Optics, vol. 27, No. 14, Jul. 15, 1988, pp. 2960–2971 (See. App. p. 6).

*Primary Examiner*—Cassandra Spyrou
*Assistant Examiner*—John Juba, Jr.
*Attorney, Agent, or Firm*—Pillsbury Madison & Sutro LLP

[57]  ABSTRACT

The invention has for its object to reduce the overall length of a single lens using a diffractive optical element, and provides a diffractive optical element applicable to an optical system for cameras such as silver salt cameras, and electronic cameras, in which both surfaces of the single lens are constructed of diffractive surfaces, are plane surfaces or have curvature, and comprise diffractive surfaces having, in order from a subject side thereof, positive power and positive power, positive power and negative power, and negative power and positive power.

2 Claims, 12 Drawing Sheets

FIG. 17
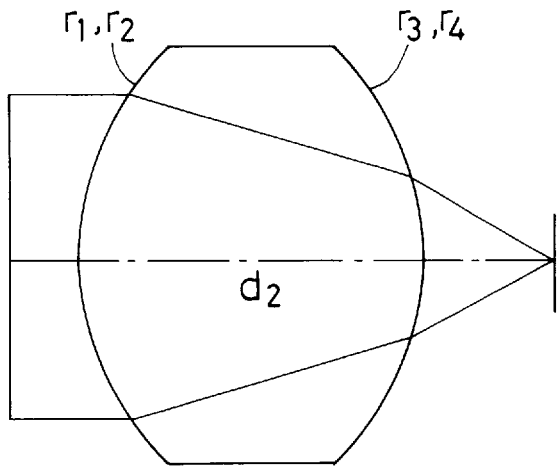
FIG. 18
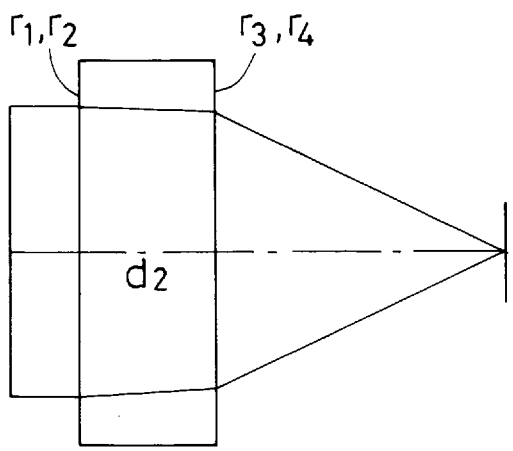
FIG. 19(a)   FIG. 19(b)   FIG. 19(c)   FIG. 19(d)
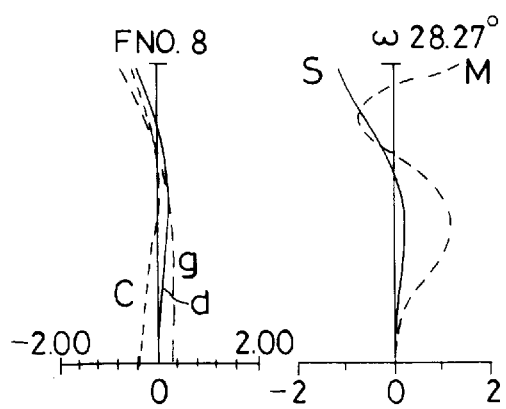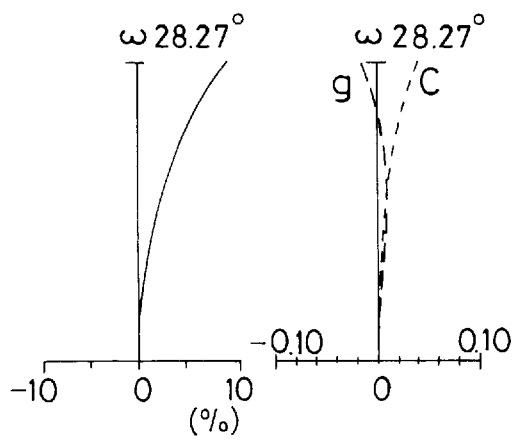

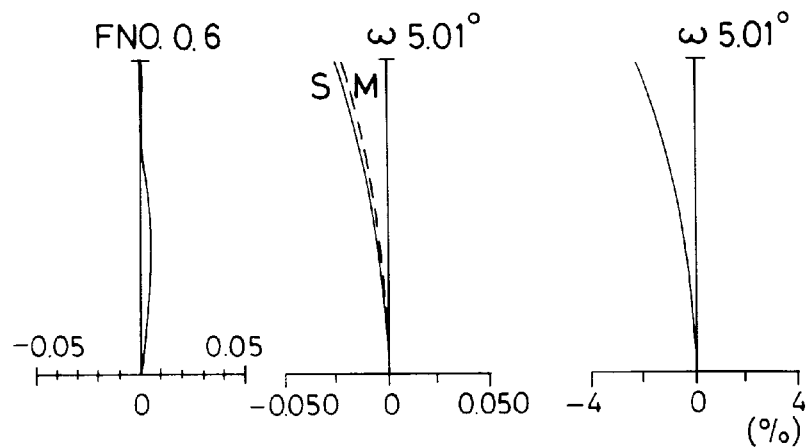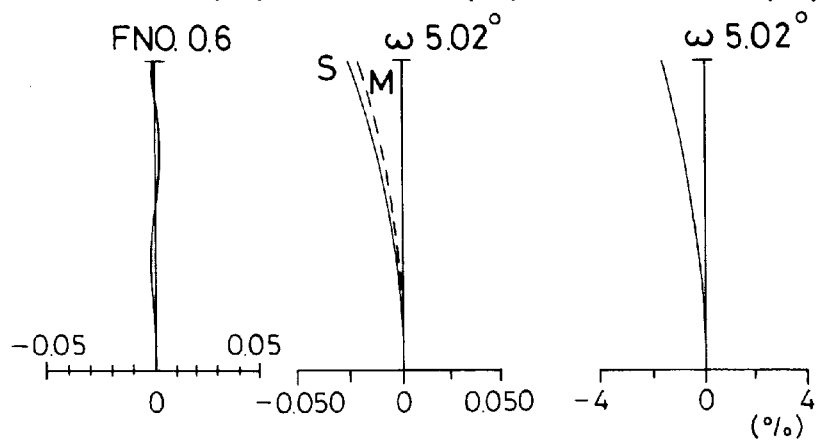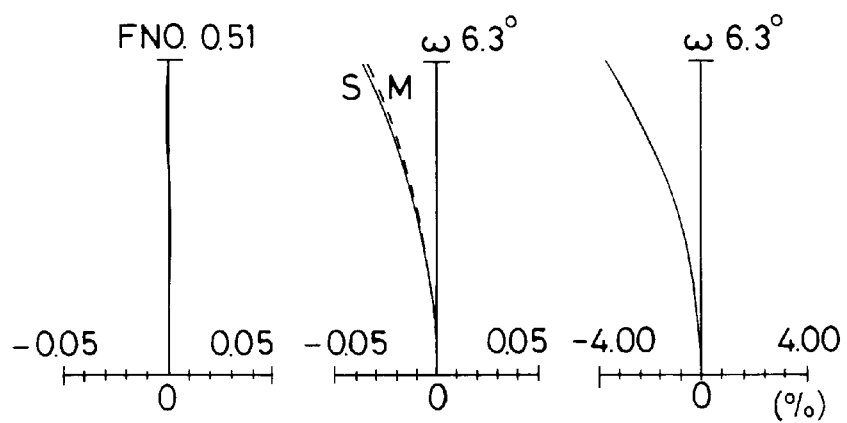

DIFFRACTIVE OPTICAL ELEMENT BOTH SURFACES OF WHICH COMPRISE DIFFRACTIVE SURFACES

BACKGROUND OF THE INVENTION

The present invention relates generally to a diffractive optical element (hereinafter DOE for short) comprising a diffractive surface having lens action based on diffraction phenomena, and more particularly to a lens system comprising a single lens both surfaces of which are constructed of diffractive surfaces.

In optical systems used on silver salt cameras, electronic cameras or the like, much more lenses and much more sophisticated arrangements are required to satisfy much higher performance, as represented by phototaking lenses. However, all available optical systems are not always structurally complicated; some optical systems are made up of one single lens. One example is an active range finder as shown in FIG. 1. This is based on the principle of trigonometric measurement as explained briefly below with reference to FIG. 1. Reference numeral 11 is an infrared-emitting diode or IRED; 12 a light projecting lens element for projecting infrared light emitted from IRED 11; 13 a subject; 14 a light receiving element for receiving light reflected from the subject 13; and 15 a position sensing device or PSD for sensing the position of the received light. IRED 11 emits infrared light, which is in turn projected through the projecting lens element 12 on the subject 13. Light reflected by the subject 13 is focused on PSD 15 through the receiving lens element 14 positioned away from the projecting lens element 12 by a base length. The subject distance is calculated from position information on PSD 15.

Light-projecting, and -receiving lens elements used on such an active range finder are often made up of one single lens. Though some lens elements are produced in the form of prisms having a reflecting surface, yet they are fundamentally composed of one single lens. These light-projecting, and -receiving lens elements are unavoidably increased in both diameter and thickness because brightness is of importance.

A lens element used on photometric devices for external photometry is again made up of a single lens. This is mounted within a camera body separately from other parts such as a phototaking lens and a finder lens to make a photometric measurement of the subject, as explained below with reference to FIG. 2. Reference numeral 21 is a condenser lens; 22 a filter; and 23 a light-receiving element. The filter 22 is to bring the spectral sensitivity of the light-receiving element 23 in conformity to film properties, and has fundamental action on cutting infrared light. The condenser lens 21 is often made up of one single lens for the purpose of achieving compactness and cost reductions. However, this lens is again unavoidably increased in size because sufficient brightness and the angle of photometry in conformity to the field angle of a photo-taking lens are needed.

The phototaking lens, too, is made up of a plastic single lens when it is used on inexpensive cameras as represented by a combined lens and film camera which, as schematically shown in FIG. 3, comprises a phototaking lens 31 made up of a single lens, an aperture stop 32, and a film surface 33. The film surface 33 is bent along its longitudinal direction and concave on the subject side. A single lens has some degrees of freedom in reducing spherical aberration or low order coma, but has no room for a choice of bending shape. In other words, the single lens is often designed in the form of a meniscus lens having a concave surface directed toward a stop, and so there is no room for making its overall length short because lens shape is predetermined in view of correction of aberrations.

For recently developed cameras, on the other hand, considerable size reductions have been desired. Many parts are mounted in a camera body. To achieve compactness, it is required to reduce the number and size of these parts. For such various lens elements as mentioned above, too, it is required to reduce their size. In view of such situations, an object of the present invention is to make a single lens smaller, especially thinner than ever before, by making use of a diffractive optical element.

Here, the diffractive optical element or DOE is explained. For details of DOE, however, see "Optics", Vol. 22, pp. 635–642, and 730–737.

While a conventional lens is based on the refraction of light at a medium interface, DOE is based on the diffraction of light. Now consider the incidence of light on such a diffraction grating as shown generally in FIG. 4. Emergent light upon diffracted satisfies the following equation (a):

$$\sin\theta - \sin\theta' = m\lambda/d \qquad (a)$$

where $\theta$ is the angle of incidence, $\theta'$ is the exit angle, $\lambda$ is the wavelength of light, d is the pitch of the diffraction grating, and m is the order of diffraction.

Therefore, if the pitch of a ring form of diffraction grating is properly determined according to equation (a), it is then possible to converge light on one point, i.e., impart lens action to the diffraction grating. Here let $r_j$ and f the radius of a j-th ring on the grating and the focal length of the diffractive surface, respectively. Then, the following equation (b) is satisfied in a region of a first approximation:

$$r_j^2 = 2j\lambda f \qquad (b)$$

For a diffraction grating, on the other hand, a bright-and-dark ring form of amplitude-modulated type grating, and a phase-modulated type grating with a variable refractive index or optical path length has been proposed. In an amplitude-modulated type DOE, for instance, the ratio between the quantity of incident light and the quantity of the first order of diffracted light is about 6% at most because plural orders of diffracted light are produced. Hereinafter, this ratio will be called the "diffraction efficiency". Even though this amplitude-modulated type DOE is modified as by bleaching into the phase-modulated type, the diffraction efficiency is about 34% at most. If the same phase-modulated type DOE as mentioned above is modified such that its section is of such saw-toothed shape as depicted in FIG. 5(a), however, the diffraction efficiency can then be increased to 100%. Such a DOE is called a kinoform. In this case, the height of each tooth is given by $$h = m\lambda/(n-1) \qquad (c)$$

where h is the height of the tooth, and n is the index of refraction of material.

As can be predicted from equation (c), a diffraction efficiency of 100% is achievable at only one wavelength. The kinoform shape may be stepwise approximated as shown in FIG. 5(c) to obtain a so-called binary optical element. This element can be relatively easily fabricated by lithography techniques. As well known in the art, the binary optical element has a diffraction efficiency of 81% to a four-step approximation, 95% to an eight-step approximation, and 99% to a sixteen-step approximation.

DOEs may be designed by some known methods. However, the present invention makes use of an ultra-high index method as set forth in an article "Mathematical equivalence between a holographic optical element and ultra-high index lens", J. Opt. Sos. Am. 69, pp. 485–487 or an article "Using a conventional optical design program to design holographic optical elements", Opt. Eng. 19, pp. 649–653. That is, the DOE is known to be equivalent to a refractive surface having null thickness and an ultra-high refractive index.

A DOE has two important features when used in the form of a lens. The first feature is aspheric action. If the pitch of a diffraction grating is properly determined, it is then possible to converge light perfectly on one point. This is tantamount to reducing spherical aberration to zero by use of an aspheric surface. The second feature is that chromatic dispersion is very large or, in another parlance, an Abbe number of −3.45 is obtainable. Chromatic aberration several tens times as large as that of a conventional refractive material is produced with a minus sign or in the opposite direction. Large dispersion offers the gravest problem when the ODE is applied to a lens element used under natural light. The refractive index of DOE at any wavelength is given by $$n(\lambda)=1+[n(\lambda_0)-1]\cdot\lambda/\lambda_0 \qquad (d)$$

where k is any wavelength, $n(\lambda)$ is the refractive index of DOE at wavelength $\lambda$, $\lambda_0$ is a reference wavelength, and $n(\lambda_0)$ is the refractive index of DOE at wavelength $\lambda_0$.

An example of applying such a DOE to an active range finder is disclosed in JP-A 7-63982. This publication shows that zooming is carried out with a converter lens inserted on the IRED side of a master lens, and that the master lens is in a plano-convex form while the converter lens is in a plano-concave form, with each plane made up of a diffractive surface. Thus, zooming is achievable while the master lens remains fixed. However, this publication says nothing about how compactness is achieved.

An example of applying a DOE to a phototaking lens is set forth in an article "Hybrid diffractive-lenses and achromats", Appl. Opt. 27, pp. 2960–2971. This prior publication shows an example of calculation in the case where, based on the principle of correction of paraxial chromatic aberration, a diffractive lens having an Abbe number of −3.45 is used in combination with a conventional refractive lens to make correction for chromatic aberration. Specifically, the publication shows a lens with the object-side surface constructed of a convex surface and the image-side surface constructed of a plane surface, wherein a diffractive surface is formed on the image-side plane, and refers to the achromatization of axial chromatic aberration and the remaining secondary spectrum. However, this publication does neither refer to chromatic aberration of magnification and other aberrations nor give any specific design data.

WO95/18393 shows an arrangement wherein a positive meniscus lens convex on a subject side and a stop are positioned, and an image-side surface of the positive lens is constructed of a diffractive surface. This publication teaches that chromatic aberration is corrected by a combined refractive and diffractive system, and alleges that high performance is achieved without any increase in the number of lens parts.

Both publications directed to the application of DOEs to phototaking lenses are primarily to make correction for chromatic aberration and state that compactness is achievable by reason of any increase in the number of lens parts. However, they fail to provide a disclosure of how the overall length of a single lens is reduced.

SUMMARY OF THE INVENTION

In view of such problems with the prior art, an object of the present invention is to reduce the overall length of a single lens by making use of a diffractive optical element, and to provide a diffractive optical element applicable to optical systems for cameras such as silver salt cameras, and electronic cameras.

The aforesaid object is achievable by the provision of a diffractive optical element, characterized in that both surfaces of said element are constructed of diffractive surfaces.

Preferably in this case, said both surfaces are constructed of plane surfaces. It is also preferable that the diffractive optical element comprises a diffractive surface of positive power and a diffractive surface of negative power in order from a subject side thereof A detailed account will now be given of why such an arrangement is used, and how it acts.

The diffractive optical element of the present invention is characterized in that both surfaces thereof are constructed of diffractive surfaces. The present invention also provides a lens system comprising a diffractive optical element characterized in that both surfaces of said diffractive optical element are constructed of diffractive surfaces.

To shorten the overall length of a lens by constructing both its surfaces of plane surfaces, it is required to provide diffractive surfaces on both its surfaces thereby making correction for coma, as will be described later. The overall length of a lens comprising a surface having curvature may be made short by bring the image-side principal point close to the subject side. To this end, however, it is required to use a strong meniscus form of lens, resulting in an increase in the quantity of aberrations produced due to strong surface power. If both surfaces of such a lens are constructed of diffractive surfaces, it is then possible to make correction for these aberrations and so shorten the overall length of the lens.

According to one specific embodiment of the present invention designed to shorten the overall length of a lens element, there is provided a diffractive optical element whose two surfaces are constructed of diffractive surfaces, wherein said diffractive surfaces are constructed of plane surfaces.

In a conventional lens element used with an active range finder or a photometric device, the power of the lens surface becomes too strong with a very reduced F-number, leading to considerable increases in the amount of sag of the lens surface (a change in the distance from the midpoint of an arc to the midpoint of its chord). For this reason, there are increases in both lens diameter and lens thickness, which make it difficult to diminish lens size. Size reductions may be achieved by allocating power to both surfaces of a lens, but this is unfeasible because it is unavoidably required to concentrate the power on the subject-side surface of the lens for the purpose of correction of aberrations. When constructing a thin lens, a diffractive surface is more favorable than a refractive surface because the amount of sag can be reduced to zero.

Referring again to a kinoform type of diffractive surface, it can substantially be regarded as being a plane surface although there are asperities of the order of a few wavelengths to several tens of wavelengths, as can be seen from equation (c). When the kinoform type of diffractive surface is applied to a lens, it is possible to make the lens thin to such degrees as determined depending on lens-processing and fabricating conditions. By designing a diffractive optical element in a plane plate lens form whose both surfaces are constructed of plane surfaces, it is therefore possible to achieve considerable lens thickness reductions. Reference is here made to the reason the two surfaces are constructed of diffractive surfaces for the purpose of correction of aberrations.

When a lens element is used at a sufficiently small field angle, only the correction of spherical aberration is needed; that is, the spherical aberration can be well corrected by one diffractive surface having aspheric action. However, when the field angle used is wide or, more specifically, when the field angle is about 5° for a lens element used on a range finder and about 20° for a lens element used on a photometric device, it is required to make correction for not only spherical aberration but coma as well. With a plane plate form of lens, however, coma cannot be prevented. To make correction for both spherical aberration and coma at the same time, it is thus required that both surfaces of the plane plate form of lens be constructed of plane surfaces.

Referring here to FIG. 6, reference numeral 61 is a diffractive surface on a subject side, and 62 a diffractive surface on the opposite side, with a stop in coincidence with the surface 61. When parallel light is incident from an object point at infinity on the diffractive surface 61, let y and y' denote the heights of a marginal ray 64 and a principal ray 65 at each surface, respectively. According to the ultra-high index method, the spherical aberration and coma produced at the subject-side diffractive surface 61 are substantially reduced to zero because its refractive index is very large whereas its curvature is very small. At the opposite diffractive surface 62, on the other hand, negative spherical aberration and positive coma are produced, resulting a performance drop. In this case, it is difficult to make correction for the positive coma produced at the diffractive surface 62. From an article "Design of a wide field diffractive landscape lens", Appl. Opt. 28, pp. 3950–3959, it is found that SI*=SI  (e)

SII*=SII+(y'/y)SI  (f)

where SI and SII are third-order spherical aberration and coma coefficients, respectively, when the stop is in close contact with the surface 61, and SI* and SII** are similar aberration coefficients when the stop is in no coincidence with the surface 61. In the case of FIG. 6, SII is designed to be canceled by SI at the diffractive surface 62 according to equation (f). In this case, SI has a negative large value due to a small value of y'/y. It is thus required to produce positive large spherical aberration at the diffractive surface 61, thereby canceling the negative spherical aberration produced at the diffractive surface 62.

In order to enable the plane form of lens to be used at a wide field angle, it is thus important to make correction for spherical aberration and coma, and so it is required to construct both its surfaces of diffractive surfaces. The diffractive surfaces are characterized in that the subject-side diffractive surface has diverging action at its peripheral portion while the opposite diffractive surface has converging action at its peripheral portion.

As explained above, large spherical aberrations with opposite signs produced at both sides of the lens are designed to be mutually canceled, and this imposes some severe limitation on the decentering accuracy of both the surfaces. Such a problem can be solved by making lens thickness larger relative to lens diameter, because the quantity of spherical aberration necessary for correction of coma can be so reduced that both surfaces can be designed with acceptably low decentering accuracy. That is, it is desired to satisfy the following condition (1):

$$0.3 < d/\phi < 1.5 \quad (1)$$

where d is the center thickness of a diffractive optical element and $\phi$ is the diameter of the diffractive optical element.

When the thickness of the lens element is less than the lower limit of 0.3 in condition (1), the decentering accuracy placed on both its surfaces becomes severe because the positive and negative spherical aberrations produced thereat become large. It is contrary to the object of reducing the overall length of the lens element that the thickness of the lens element exceeds the upper limit of 1.5 in condition (1).

In another more specific embodiment of the present invention, both surfaces of a diffractive optical element are constructed of diffractive surfaces, and positive and negative powers are given to the diffractive surfaces in order from a subject side of the diffractive optical element, thereby shortening the overall length thereof.

Such a positive-negative power profile or a so-called telephoto type power profile enables the overall length of the lens element to be shortened because the principal point position can be moved toward the subject side irrespective of whether the lens surface is a plane surface or a surface having curvature. When the aforesaid power profile is applied to a conventional refractive system, it is impossible to make sufficient correction for aberrations because when power just enough to shorten the overall length of the lens element is imparted to a surface, that surface has too large a curvature. However, the use of the diffractive system can make a reasonable compromise between correction of aberrations and a decrease in the overall length of the lens element.

Herein it is desired to satisfy the following condition (2) or (3):

$$-20 < f_2/f < -2 \quad (2)$$

$$-5 < f_2/f < -0.5 \quad (3)$$

where f is the focal length of the diffractive optical element, and $f_2$ is the focal length of the diffractive surface that is not opposite to the subject side.

Condition (2) is generally applied to a lens element where a high level of aberration correction is needed, for instance, a phototaking lens element. A plane plate form of diffractive lens is practically unacceptable for a phototaking lens even if it is constructed of an inexpensive single lens, because some considerable chromatic aberration is produced. Even with a plano-convex form of lens element such as one explained with reference to the prior art, it is impossible to obtain sufficient performance because coma remains undercorrected and large chromatic aberration of astigmatism is produced. This is true of even when a diffractive surface is used with the plano-convex form of lens element. To make good correction for monochromatic aberration and chromatic aberration, therefore, it is required that both surfaces be constructed of lens surfaces having curvature, and that one diffractive surface be used. Only by use of this, however, it is difficult to shorten the overall length of the lens element. In the practice of the present invention, therefore, both surfaces are constructed of diffractive surfaces, and are provided with positive power and negative power in order from the subject side. It is then desired to satisfy condition (2). When the negative power is less than the lower limit of −20 in condition (2), no action is obtained on shortening the overall length of the lens element. Negative power exceeding the upper limit of −2 in condition (2) is preferable to shorten the overall length of the lens element, but is unfavorable for the present invention because large chromatic aberration of magnification is introduced therein. Because of large dispersion, a diffractive surface yields noticeable chromatic aberration relative to power changes.

On the other hand, condition (3) is generally applied to a lens element used on a range finder or a photometric device. The overall length of this lens element can be shortened by giving thereto power relatively stronger than defined by condition (2), because chromatic aberration offers little, if any, problem. It is then desired to satisfy condition (3). When the negative power is less than the lower limit of −5 in condition (3), no action is obtained on shortening the overall length of the lens element. Negative power exceeding the upper limit of condition (3) is preferable to shorten the overall length of the lens element, but make it unacceptably difficult to make correction for monochromatic aberration.

As explained with reference to condition (2), it is preferred that both surfaces have curvature, because there is obtained a high-performance lens element having a high degree of freedom in correction of aberrations. It is herein preferable that the DOE is of such shape that a convex surface thereof is directed toward the subject side. It is consequently possible to allocate most of the positive power of the subject-side surface to the refractive surface, so that the power of the diffractive surface can be reduced. The smaller the power of the diffractive surface, the larger the inter-pattern space of the diffractive pattern, and hence the easier the pattern processing. If the surface that is not opposite to the subject side is constructed of a concave surface, as in the case of a phototaking lens element or a lens element used on a range finder, such as those explained in the examples to be given later, it is possible to allocate most of the negative power to the refractive surface, so that the power of the diffractive surface can be reduced. In other words, the lens element is preferably of meniscus shape with a convex surface directed toward the subject side.

In such a positive-negative power profile, it is preferred that a large space is given between both powers because a telephoto arrangement is easily achievable. In other words, it is preferable for correction of aberrations to make lens thickness as large as possible, because the larger the lens thickness, the lower the power of each diffractive surface can be. It is then desired to satisfy the following condition (4):

$$0.2 < d/f < 1.5 \quad (4)$$

where d is the center thickness of the diffractive optical element, and f is the focal length of the diffractive optical element.

When the thickness of the diffractive optical element is less than the lower limit of 0.2 in condition (4), it is difficult to make correction for monochromatic aberration because the power of each surface becomes too strong to reduce the overall length of the single lens. When the thickness of the diffractive optical element exceeds the upper limit of 1.5 in condition (4), the size of the single lens element becomes too large due to the thickness of the DOE itself. In this connection, it is noted that condition (4) is not applied to the DOE when it is designed in the form of a prism having a reflecting surface.

When both surfaces are plane surfaces, there arises a problem that the inter-pattern space of the diffraction pattern becomes too narrow because all powers are allocated to the diffractive surfaces. Consequently, it is very difficult to process and fabricate DOEs. Further, if the space becomes narrow a few times as fine as wavelength, the diffractive optical element is no longer regarded as being a plane form of DOE. By constructing both surfaces of a plane plate form of lens of diffractive surfaces having positive power, however, it is possible to improve processability because power can be allocated to both surfaces to make the inter-pattern space wide.

As already explained with respect to a plane plate form of lens, the lens is designed such that, for the purpose of correction of aberrations, the subject-side surface has diverging action while the opposite surface has converging action. When, in this case, paraxial power-converging action is given to the subject-side surface, production difficulty is expected, because the converging action changes to the diverging action from the center to periphery of the lens, leading to a shape where positive power is mixed with negative power. If negative power is allocated to the subject-side surface of a plane plate form of lens and positive power is allocated to the opposite side thereof, however, it is then possible to fabricate the plane plate form of lens easily because a reasonable compromise can be made between processability and correction of aberrations. In this case, it is preferable to use the higher orders of diffracted light because the inter-pattern space of the diffraction pattern remains narrow. In this regard, it is noted that the higher the order of diffraction, the lower the diffraction efficiency is when the wavelength used differs from the designed wavelength. In DOEs used over a wide wavelength region, the designed order of diffraction is at most about second order, as is the case with a phototaking lens. For a lens system used with a range finder, on the other hand, it is possible to use at least the tenth order of diffraction because the wavelength region of IRED is narrow. In this case, too, the depth of the diffraction pattern becomes large as the inter-pattern space of the diffraction pattern become wide.

Still other objects and advantages of the present invention will in part be obvious and will in part be apparent from the specification.

The present invention accordingly comprises the features of construction, combinations of elements, and arrangement of parts which will be exemplified in the construction hereinafter set forth, and the scope of the present invention will be indicated in the claims.

BRIEF DESCRIPTION OF THE DRAWINGS

FIG. 17 is a sectional view illustrative of a lens element of Example 10 according to the present invention.

FIG. 18 is a sectional view illustrative of a lens element of Example 11 according to the present invention.

FIGS. 19(a)–19(d) are aberration diagrams diagram of Example 1.

FIGS. 23(a)–23(c) are aberration diagrams of Example 5.

FIGS. 24(a)–24(c) are aberration diagrams of Example 6.

FIGS. 25(a)–25(c) are aberration diagrams of Example 7.

DESCRIPTION OF THE PREFERRED EMBODIMENTS

The lens system using the diffractive optical element according to the present invention will be described with reference to Examples 1 to 11.

Diffractive surfaces of the diffractive optical element according to the present invention are designed using the ultra-high index method, and specifically expressed by a refractive index of 1001 at null thickness and d-line wavelength, and a refractive index of 1533 at wavelength 900 nm. In numerical data given later, too, an ordinary aspheric equation such as one shown below is used. Here let a Z-axis and a Y-axis be an optical axis direction and a direction perpendicular to the optical axis, respectively. Then, an aspheric surface is given by $$Z=CY^2/[1+\sqrt{1-(1+K)C^2Y^2}]+A_4Y^4+A_6Y^6+A_8Y^8+A_{10}Y^{10} \quad (g)$$

where C is curvature at a surface apex (=1/r where r is the radius of curvature), K is a conical coefficient, and $A_4$, $A_6$, $A_8$, $A_{10}$ are fourth, sixth, eighth, and tenth-order aspherical coefficients, respectively.

A surface coming in contact with a diffractive surface at null thickness is a surface of DOE-forming material. In the actual production of DOE, a diffraction grating is formed on the surface of the material using a phase change found from a difference between the aspheric shape of the diffractive surface and the surface shape of the material and the indices of refraction. In other words, it is the surface of the material which has final lens action in each of the examples given later.

Figure 1:
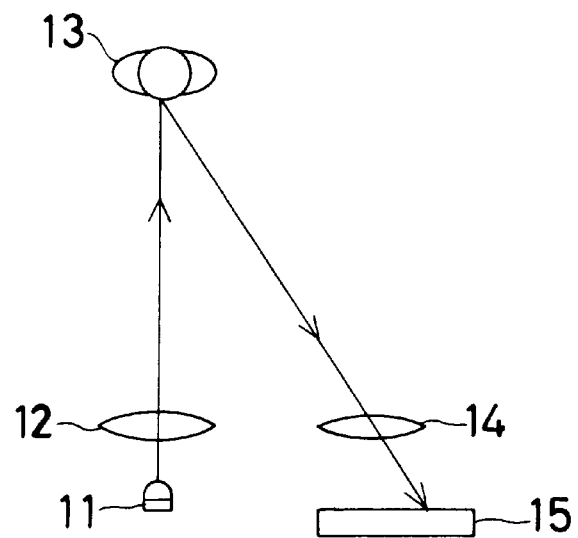
FIG. 1 is a schematic view of an optical system used on an active range finder.
Figure 2:
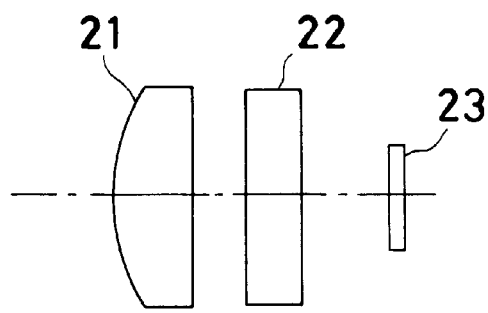
FIG. 2 is a schematic view of an optical system used on a photometric device.
Figure 3:
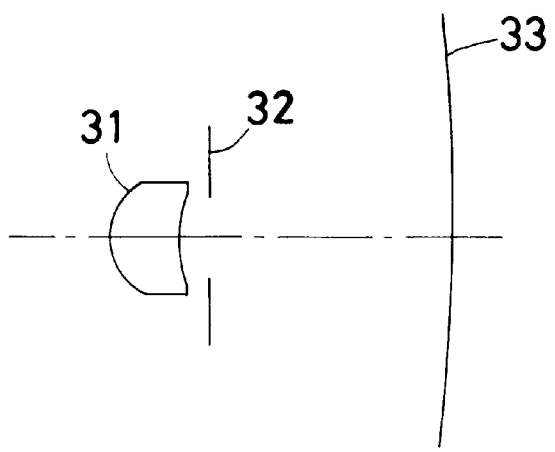
FIG. 3 is a schematic view of a phototaking lens system.
Figure 4:
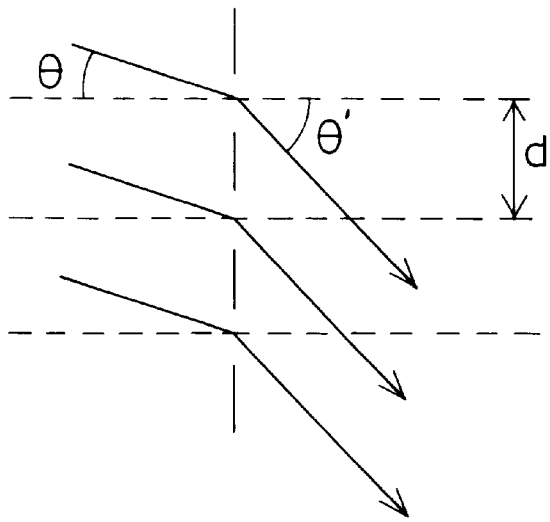
FIG. 4 is a view illustrative of the diffraction of a diffraction grating.
Figure 5A:
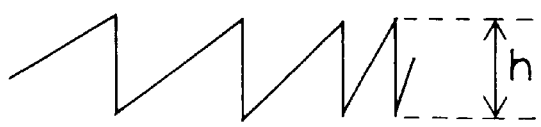
FIGS. 5(a) and 5(b) are sectional views illustrative of a kinoform and a binary optical system.
Figure 5B:
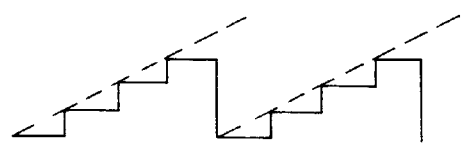
Figure 6:
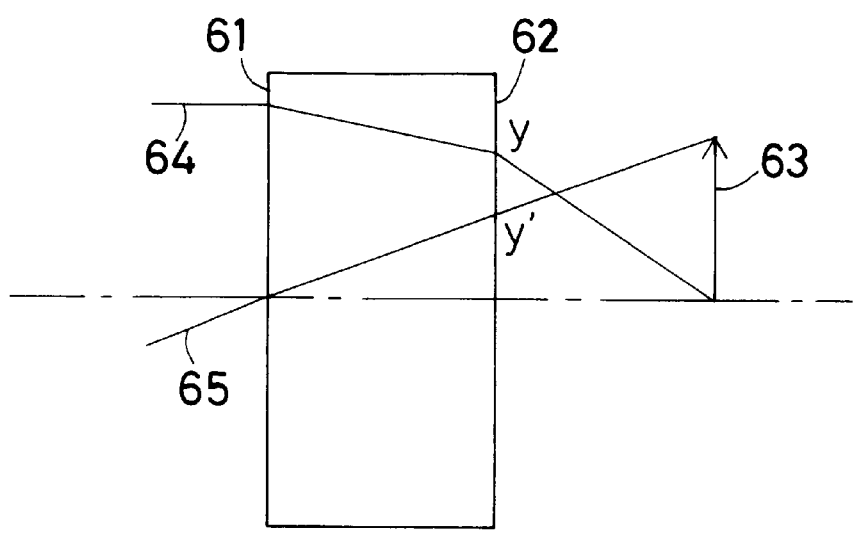
FIG. 6 is a view illustrative of correction of aberrations by a diffractive optical system according to the present invention.
Figure 7A:
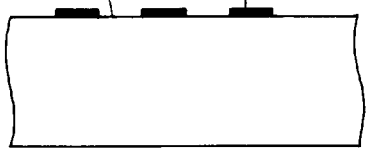
FIGS. 7(a)—7(f) illustrate specific shapes of diffractive surfaces of a diffractive optical element according to the present invention.
Figure 7B:
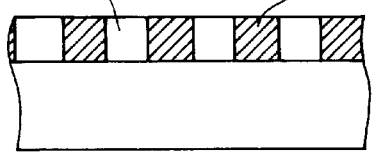
Figure 7C:
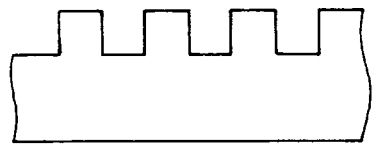
Figure 7D:
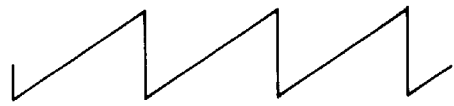
Figure 7E:
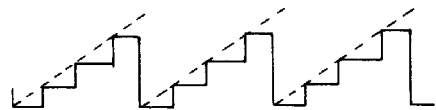
Figure 7F:

Some exemplary sectional shapes of the diffractive surface are shown in FIGS. 7(a)–7(f). Shown in FIG. 7(a) is a diffractive surface called an amplitude-modulated type wherein an alternate arrangement of transparent and opaque portions 71 and 72 is provided, with the thickness of each opaque portion 72 being substantially zero. Shown in FIG. 7(b) is an alternate arrangement of high- and low-refractive index portions 73 and 74, to which diffraction is imparted through a phase difference due to a refractive index difference. Shown in FIG. 7(c) is an alternate arrangement of rectangular asperities, to which diffraction is imparted through a phase difference due to a thickness difference. This arrangement is also called a 2-level binary element. Shown in FIG. 7(d) is a kinoform arrangement having a saw-toothed surface, to which diffraction is imparted by a phase difference due to a continuous thickness difference (see FIG. 5(a)). FIG. 7(e) and 7(f) are illustrative of binary elements to 4-, and 8-level approximation (see FIG. 5(b)). Thus, some diffractive surface shapes are available. In the practice of the present invention, however, it is preferable to use the kinoform of FIG. 7(d), and the 4-, or more level binary elements of FIG. 7(e) and 7(f) so that the diffraction efficiency can be increased to make full use of the quantity of light.

Sectional views of lens systems of Examples 1 to 11 inclusive of their optical axes are shown in FIGS. 8 to 18. Numerical data on each example will be given later. Examples 1–4 are directed to exemplary phototaking lens designs. Throughout these examples, each material has curvature at both surfaces, and is formed into a meniscus shape with a concave surface thereof directed toward a stop, so that monochromatic aberration can be well corrected. For phototaking lenses used on cameras, etc., it is desired that chromatic aberration be corrected over a wavelength region from g-line to C-line.

Figure 8:
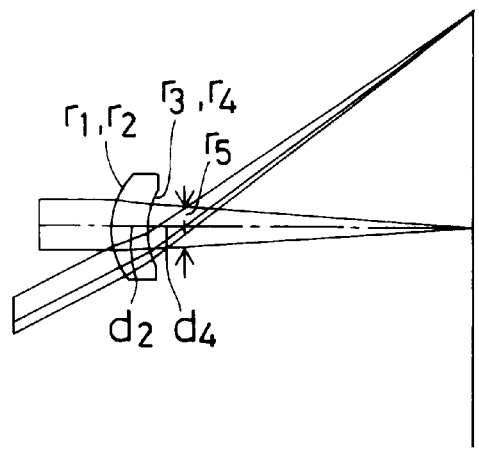
FIG. 8 is a sectional view illustrative of a lens element of Example 1 according to the present invention.

Example 1 is directed to a single lens element having a rear stop, as depicted in FIG. 8. The single lens element is formed of acrylic material, with both surfaces constructed of diffractive surfaces. Both surfaces have positive power, and their focal lengths are 968.68 mm and 380.66 mm, respectively, in order from the subject side of the lens element.

Figure 9:
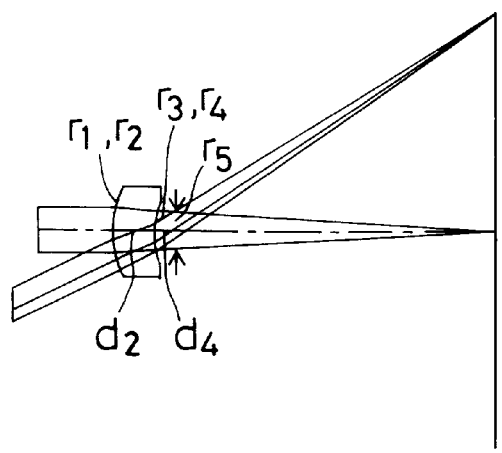
FIG. 9 is a sectional view illustrative of a lens element of Example 2 according to the present invention.

Example 2 is directed to a single lens element having a rear stop, as depicted in FIG. 9. The single lens element is formed of acrylic material, with both surfaces constructed of diffractive surfaces. Both diffractive surfaces have positive power and negative power in order from the subject side of the lens element, and have focal lengths of 159.87 mm and −121.05 mm.

Figure 10:
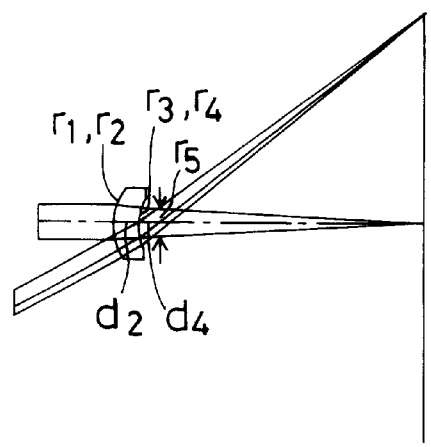
FIG. 10 is a sectional view illustrative of a lens element of Example 3 according to the present invention.

Example 3 is directed to a single lens element having a rear stop, as depicted in FIG. 10. The single lens element is formed of acrylic material, with both surfaces constructed of diffractive surfaces. Both diffractive surfaces have positive power and negative power in order from the subject side of the lens element, and have focal lengths of 204.18 mm and −542.18 mm. By comparison, Example 2 is found to be inferior in peripheral performance to Example 3 because larger chromatic aberration of magnification is produced due to stronger powers allocated to the diffractive surfaces, although the overall length of the lens element can be much more reduced according to Example 2 than according to Example 3.

Figure 11:
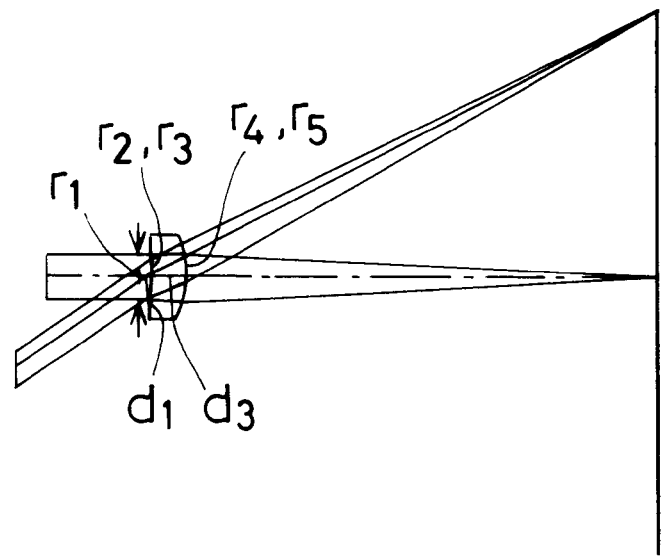
FIG. 11 is a sectional view illustrative of a lens element of Example 4 according to the present invention.

Example 4 is directed to a single lens element having a front stop, as depicted in FIG. 11. The single lens element is formed of polycarbonate material, with both surfaces constructed of diffractive surfaces. Both diffractive surfaces have negative power and positive power in order from the subject side of the lens element, and have focal lengths of −305.61 mm and 162.62 mm.

Examples 5 to 9 are directed to exemplary light-projecting lens designs used for an active range finder. In each example, an IRED has a light-emitting portion covered with a resinous package having curvature.

Figure 12:
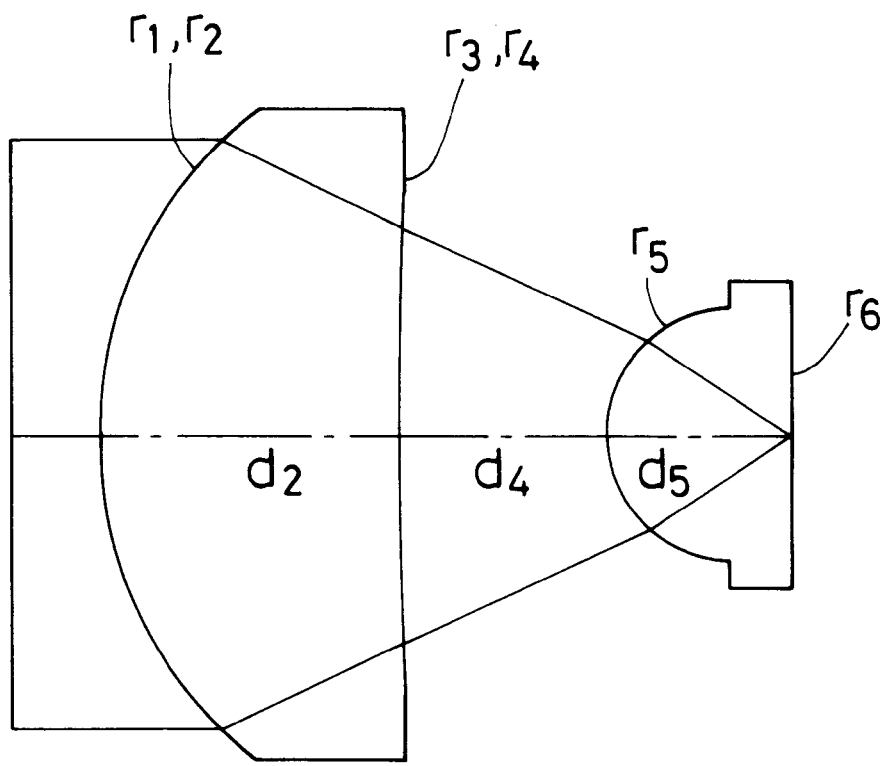
FIG. 12 is a sectional view illustrative of a lens element of Example 5 according to the present invention.

In Example 5, both surfaces of acrylic material are constructed of diffractive surfaces having positive power and negative power in order from a subject side, as shown in FIG. 12. The material has curvature at both surfaces, and is formed into a meniscus shape convex on the subject side. The diffractive surfaces have focal lengths of 27.68 mm and −28.66 mm.

Figure 13:
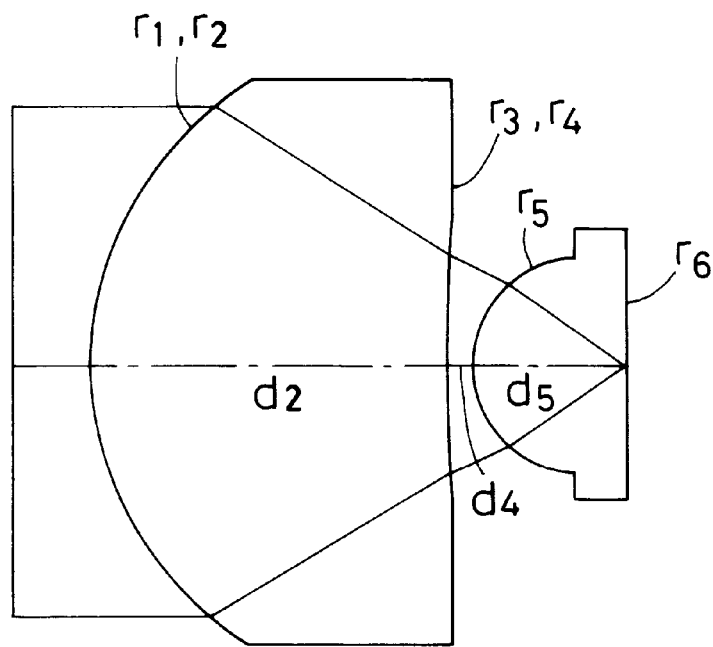
FIG. 13 is a sectional view illustrative of a lens element of Example 6 according to the present invention.

In Example 6, both surfaces of acrylic material are constructed of diffractive surfaces having positive power and negative power in order from a subject side, as shown in FIG. 13. The material has curvature at both surfaces, and is formed into a meniscus shape convex on the subject side. The diffractive surfaces have focal lengths of 20.58 mm and −9.21 mm. According to this example, the overall length of the lens element can be much more reduced than according to Example 5, because the powers of the diffractive surfaces and the center thickness are increased.

Figure 14:
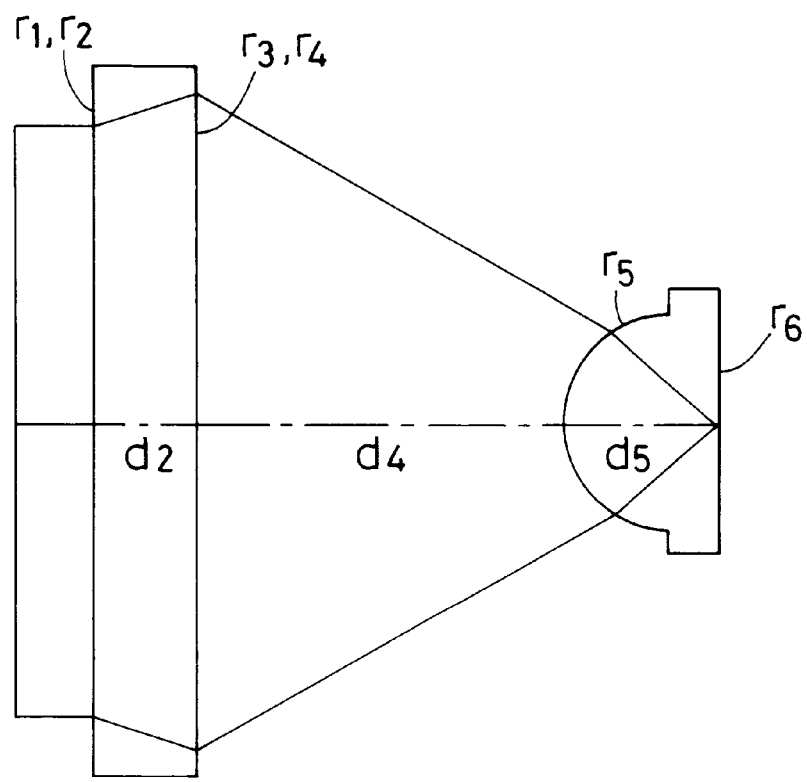
FIG. 14 is a sectional view illustrative of a lens element of Example 7 according to the present invention.

In Example 7, both surfaces of acrylic material are constructed of diffractive surfaces having positive power and negative power in order from a subject side, as shown in FIG. 14. Both surfaces of the material are plane surfaces, forming a plane plate form of lens. The diffractive surfaces have focal lengths of 23.31 mm and 23.31 mm.

Figure 15:
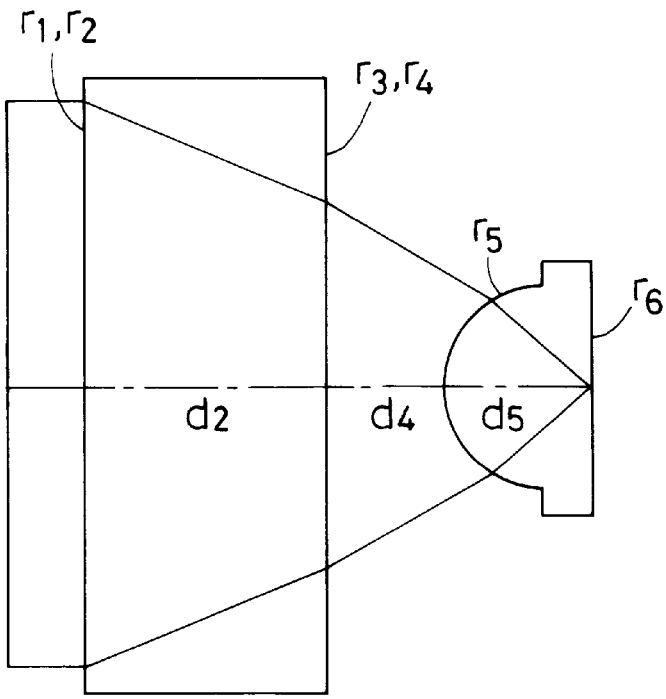
FIG. 15 is a sectional view illustrative of a lens element of Example 8 according to the present invention.

In Example 8, both plane surfaces of acrylic material are constructed of diffractive surfaces having positive power and negative power in order from a subject side, as shown in FIG. 15, so that the overall length of the lens element can be much more reduced. The diffractive surfaces have focal lengths of 7.50 mm and −11.02 mm.

Figure 16:
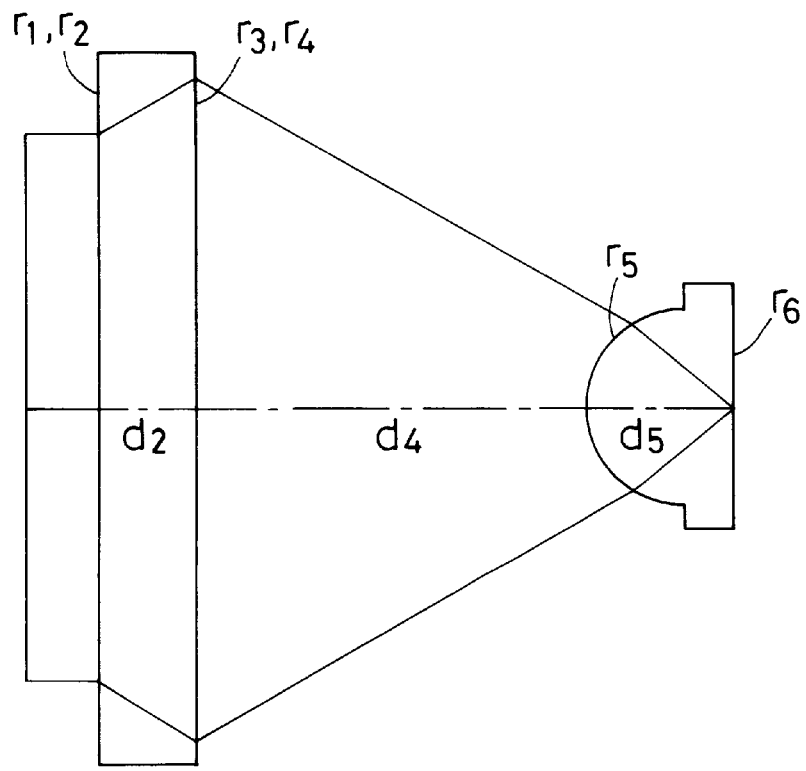
FIG. 16 is a sectional view illustrative of a lens element of Example 9 according to the present invention.
Figures 20A, 20B, 20C, 20D:
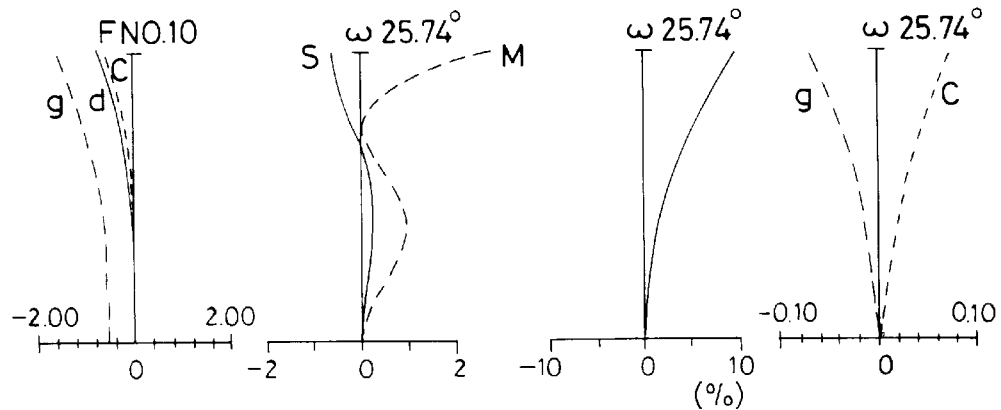
FIGS. 20(a)–20(b) are aberration diagrams of Example 2.
Figures 21A, 21B, 21C, 21D:
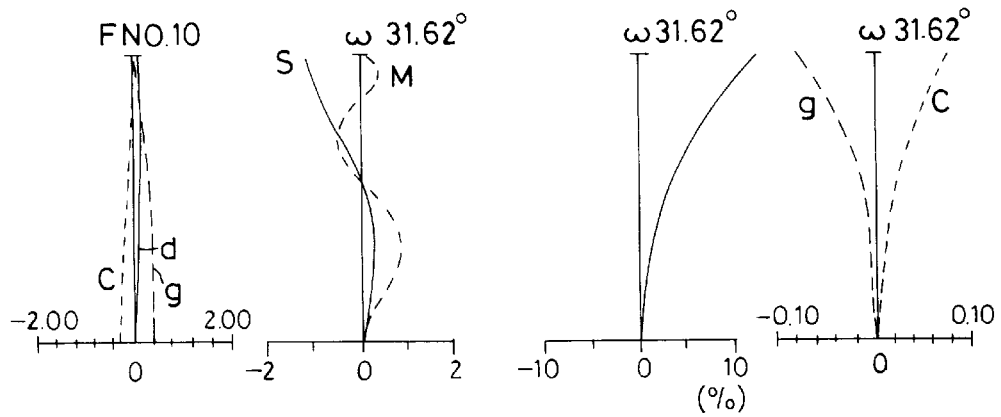
FIGS. 21(a)–21(d) are aberration diagrams of Example 3.
Figures 22A, 22B, 22C, 22D:
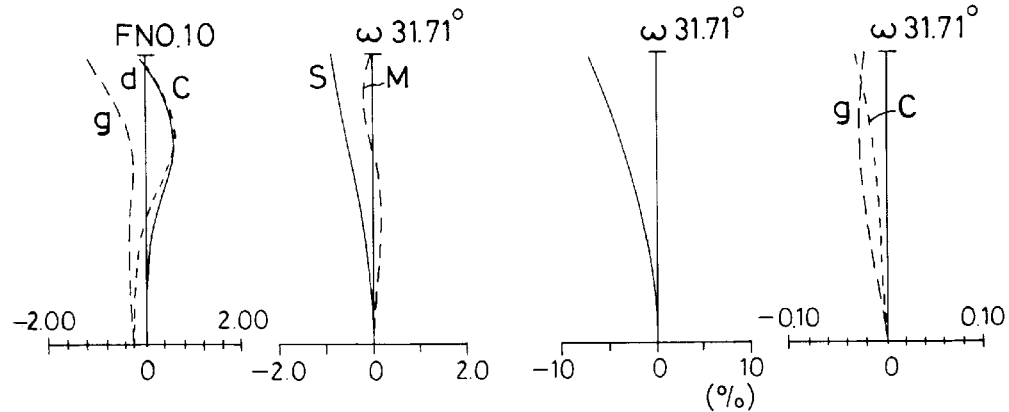
FIGS. 22(a)–22(d) are aberration diagrams of Example 4.
Figures 26A, 26B, 26C:
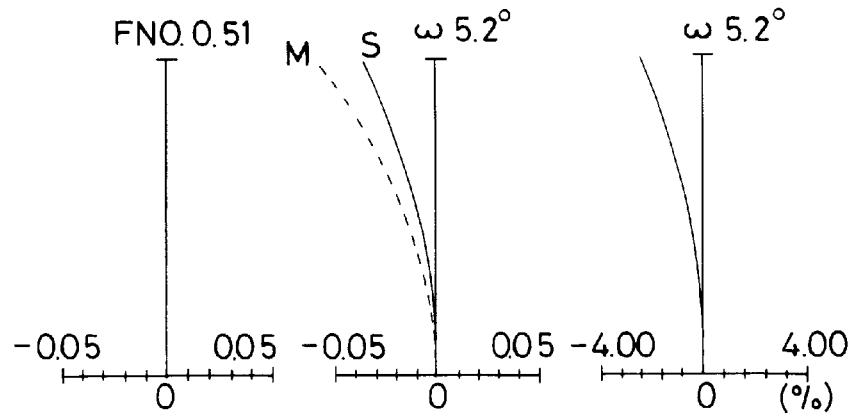
FIGS. 26(a)–26(c) are aberration diagrams of Example 8.
Figures 27A, 27B, 27C:
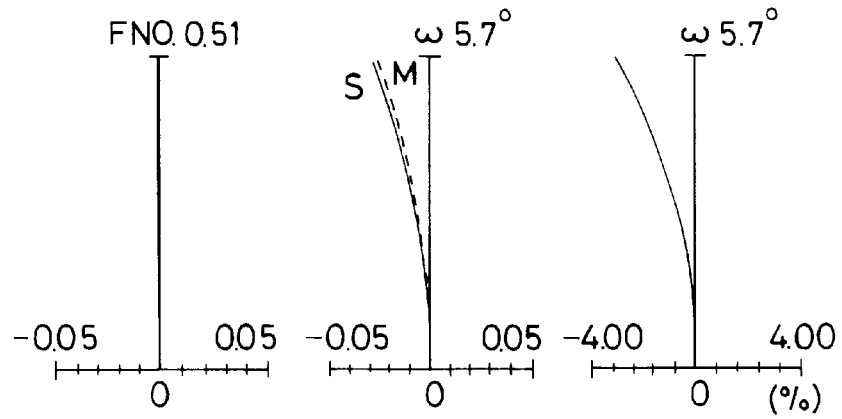
FIGS. 27(a)–27(c) are aberration diagrams of Example 9.
Figures 28A, 28B, 28C, 28D:
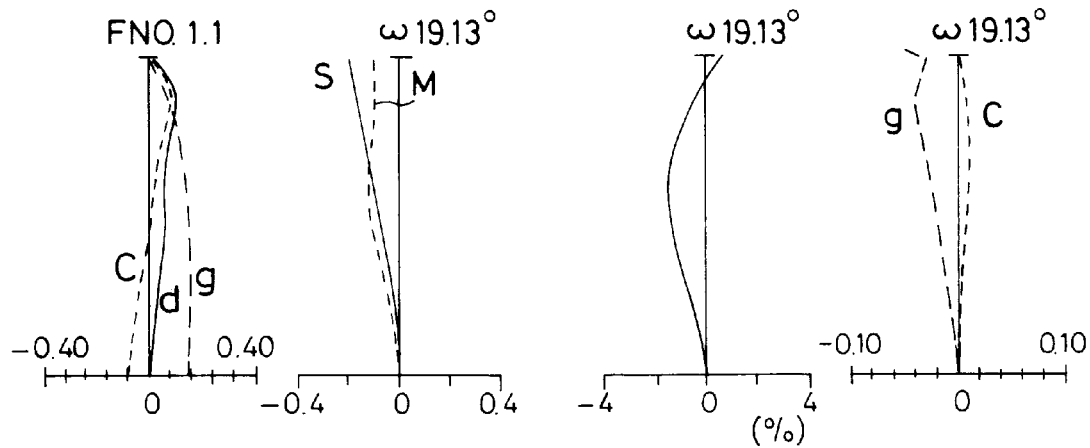
FIGS. 28(a)–28(d) are aberration diagrams of Example 10.
Figures 29A, 29B, 29C, 29D:
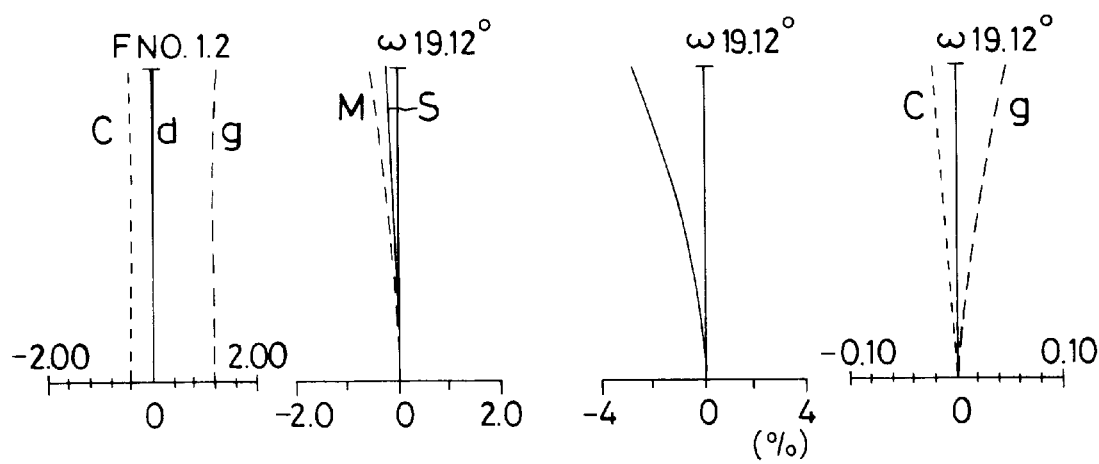
FIGS. 29(a)–29(d) are aberration diagrams of Example 11.

In Example 9, both plane surfaces of acrylic material are constructed of diffractive surfaces having negative power and positive power in order from a subject side, as shown in FIG. 16. The diffractive surfaces have focal lengths of −51.92 mm and 10.00 mm.

Examples 10 and 11 are directed to exemplary lens system designs used for a photometric device.

In Example 10, both surfaces of a double-concave form of acrylic material are constructed of diffractive surfaces having positive power and negative power in order from a subject side, as shown in FIG. 17. The diffractive surfaces have focal lengths of 14.40 mm and −10.47 mm.

In Example 11, both plane surfaces of acrylic material are constructed of diffractive surfaces having positive and positive power in order from a subject side, as shown in FIG. 18. The diffractive surfaces have focal lengths of 6.96 mm and 6.96 mm.

Throughout the examples, diffractive surfaces are formed on the surfaces of resinous material. Resinous material is preferable because large quantities of diffractive optical elements can be inexpensively produced by molding techniques. It is also possible to reduce the weight of parts. For lenses used over a wide wavelength region such as phototaking lenses, and lenses used with photometric devices, it is desired to use acrylic or other materials having a large Abbe's number, thereby reducing the quantity of residual chromatic aberration when making correction of chromatic aberration by a combined refractive and diffractive system.

Lenses molded of resinous materials are likely to undergo property changes depending on changes in the temperature and humidity of an atmosphere in which they are used. If lenses are formed of polyolefin materials, however, it is possible to avoid adverse influences due to temperature changes because such materials are of low hygroscopicity.

Set out below are numerical data on Examples 1 to 11. In these data,

F is the focal length of the overall system, f is the focal length of the diffractive optical element, $F_{NO}$ is F-number $f_B$ is a back focus, ω is a half field angle, $r_1, r_2, \ldots$ are the radii of curvature of lens surfaces, $d_1, d_2, \ldots$ are separations between adjacent lens surfaces, $n_{d1}, n_{d2}, \ldots$ are the d-line indices of refraction of lenses, $v_{d1}, v_{d2}, \ldots$ are the d-line Abbe's numbers of lenses, and $n_{900.1}, n_{900.2}, \ldots$ are the indices of refraction of lenses at wavelength 900 nm, The aspheric shape is represented by equation (g) already mentioned.

"DIFFR.SF" and "L.E.D." are abbreviations of diffractive surface and light-emitting diode, respectively.

Example 1
F = 40.16 mm, $F_{NO}$ = 8.0, $f_B$ = 29.95 mm, ω = 28.3°

| | | | |
|---|---|---|---|
| $r_1$ = 7.62367 (DIFFR.SF) | $d_1$ = 0 | $n_{d1}$ = 1001 | $v_{d1}$ = −3.45 |
| $r_2$ = 7.62373 | $d_2$ = 3.8 | $n_{d2}$ = 1.49241 | $v_{d2}$ = 57.66 |
| $r_3$ = 9.55803 | $d_3$ = 0 | $n_{d3}$ = 1001 | $v_{d3}$ = −3.45 |
| $r_4$ = 9.55827 (DIFFR.SF) | $d_4$ = 3.5 | | |
| $r_5$ = ∞ (Stop) | | | |

Aspherical Coefficients

1st surface

K = 0
$A_4 = 3.8782 \times 10^{-8}$
$A_6 = -7.3318 \times 10^{-10}$
$A_8 = 9.3894 \times 10^{-11}$
$A_{10} = -5.3266 \times 10^{-13}$ 4th surface K = 0
$A_4 = 3.1926 \times 10^{-7}$
$A_6 = -4.0794 \times 10^{-8}$
$A_8 = 4.7505 \times 10^{-9}$
$A_{10} = -1.6735 \times 10^{-10}$ Example 2
F = 44.79 mm, $F_{NO}$ = 10.0, $f_B$ = 33.10 mm, ω = 25.7°

| | | | |
|---|---|---|---|
| $r_1$ = 7.79408 (DIFFR.SF) | $d_1$ = 0 | $n_{d1}$ = 1001 | $v_{d1}$ = −3.45 |
| $r_2$ = 7.79446 | $d_2$ = 4.7 | $n_{d2}$ = 1.49241 | $v_{d2}$ = 57.66 |
| $r_3$ = 9.46476 | $d_3$ = 0 | $n_{d3}$ = 1001 | $v_{d3}$ = −3.45 |
| $r_4$ = 9.46402 (DIFFR.SF) | $d_4$ = 1.9 | | |
| $r_5$ = ∞ (Stop) | | | |

Aspherical Coefficients

1st surface

K = 0
$A_4 = -2.1507 \times 10^{-8}$
$A_6 = 7.1525 \times 10^{-9}$
$A_8 = -3.6163 \times 10^{-10}$
$A_{10} = 7.8368 \times 10^{-12}$ 4th surface K = 0
$A_4 = 1.0745 \times 10^{-7}$
$A_6 = 1.3145 \times 10^{-8}$
$A_8 = -6.6927 \times 10^{-10}$
$A_{10} = 2.4583 \times 10^{-11}$
$f_2/f = -2.70$ (f = 44.79)
d/f = 0.10 (f = 44.79)

Example 3
F = 35.08 mm, $F_{NO}$ = 10.0, $f_B$ = 27.41 mm, ω = 31.6°

| | | | |
|---|---|---|---|
| $r_1$ = 6.06231 (DIFFR.SF) | $d_1$ = 0 | $n_{d1}$ = 1001 | $v_{d1}$ = −3.45 |
| $r_2$ = 6.06249 | $d_2$ = 2.8 | $n_{d2}$ = 1.49241 | $v_{d2}$ = 57.66 |

-continued

| | | |
|---|---|---|
| $r_3 = 7.36331$ | $d_3 = 0$ | $n_{d3} = 1001$ $\quad \nu_{d3} = -3.45$ |
| $r_4 = 7.36321$ (DIFFR.SF) | $d_4 = 2.0$ | |
| $r_5 = \infty$ (Stop) | | |

Aspherical Coefficients

1st surface $K = 0$
$A_4 = -5.5812 \times 10^{-8}$
$A_6 = 2.8355 \times 10^{-8}$
$A_8 = -2.0264 \times 10^{-9}$
$A_{10} = 7.9702 \times 10^{-11}$ 4th surface $K = 0$
$A_4 = 1.9277 \times 10^{-7}$
$A_6 = 5.9853 \times 10^{-8}$
$A_8 = -4.1730 \times 10^{-9}$
$A_{10} = 2.5641 \times 10^{-10}$
$f_2/f = -15.46$ (f = 35.08)
$d/f = 0.08$ (f = 35.08)

Example 4
$F = 34.97$ mm, $F_{NO} = 10.0$, $f_B = 39.43$ mm, $\omega = 31.7°$

| | | |
|---|---|---|
| $r_1 = \infty$ (Stop) | $d_1 = 1.0$ | $n_{d1} = 1001$ $\quad \nu_{d1} = -3.45$ |
| $r_2 = -9.41405$ (DIFFR.SF) | $d_2 = 0$ | $n_{d2} = 1.58423$ $\quad \nu_{d2} = 30.49$ |
| $r_3 = -9.41434$ | $d_3 = 3.0$ | $n_{d3} = 1001$ $\quad \nu_{d3} = -3.45$ |
| $r_4 = -7.54447$ | $d_4 = 0$ | |
| $r_5 = -7.54412$ (DIFFR.SF) | | |

Aspherical Coefficients

2nd surface $K = 0$
$A_4 = -2.4353 \times 10^{-7}$
$A_6 = -2.2464 \times 10^{-7}$
$A_8 = 8.1057 \times 10^{-8}$
$A_{10} = -9.4824 \times 10^{-9}$ 5th surface $K = 0$
$A_4 = -5.1609 \times 10^{-8}$
$A_6 = -2.6784 \times 10^{-8}$
$A_8 = 2.8376 \times 10^{-9}$
$A_{10} = -1.4246 \times 10^{-10}$ Example 5
$F = 5.70$ mm, $F_{NO} = 0.6$, $\omega = 5.1°$

| | | |
|---|---|---|
| $r_1 = 6.70362$ (DIFFR.SF) | $d_1 = 0$ | $n_{900.1} = 1533$ |
| $r_2 = 6.70468$ | $d_2 = 5.000$ | $n_{900.2} = 1.48536$ |
| $r_3 = 95.28850$ | $d_3 = 0$ | $n_{900.3} = 1533$ |
| $r_4 = 95.08216$ (DIFFR.SF) | $d_4 = 3.524$ | $n_{900.4} = 1.54000$ |
| $r_5 = 2$ | $d_5 = 3$ | |
| $r_6 = \infty$ (L.E.D.) | | |

Aspherical Coefficients

1st surface $K = 0$
$A_4 = 8.2801 \times 10^{-9}$
$A_6 = -1.1027 \times 10^{-9}$
$A_8 = -4.9699 \times 10^{-11}$
$A_{10} = 5.3782 \times 10^{-12}$ 4th surface $K = 0$
$A_4 = 4.7607 \times 10^{-7}$
$A_6 = -6.4340 \times 10^{-8}$
$A_8 = 6.8222 \times 10^{-9}$
$A_{10} = -1.9928 \times 10^{-10}$
$f_2/f = -2.38$ (f = 12.03)
$d/f = 0.42$ (f = 12.03)

Example 6
$F = 5.69$ mm, $F_{NO} = 0.6$, $\omega = 5.1°$

| | | |
|---|---|---|
| $r_1 = 5.91509$ (DIFFR.SF) | $d_1 = 0$ | $n_{900.1} = 1533$ |
| $r_2 = 5.91620$ | $d_2 = 7.000$ | $n_{900.2} = 1.48536$ |
| $r_3 = 32.94377$ | $d_3 = 0$ | $n_{900.3} = 1533$ |
| $r_4 = 32.8706$ (DIFFR.SF) | $d_4 = 3.000$ | $n_{900.4} = 1.54000$ |
| $r_5 = 2$ | $d_5 = 3$ | |
| $r_6 = \infty$ (L.E.D.) | | |

Aspherical Coefficients

1st surface $K = 0$
$A_4 = -7.5948 \times 10^{-10}$
$A_6 = -2.211 \times 10^{-9}$
$A_8 = 8.6312 \times 10^{-11}$
$A_{10} = -1.2705 \times 10^{-12}$ 4th surface $K = 0$
$A_4 = 2.0995 \times 10^{-6}$
$A_6 = 1.2904 \times 10^{-8}$
$A_8 = 4.1043 \times 10^{-9}$
$A_{10} = 8.0099 \times 10^{-10}$
$f_2/f = -0.77$ (f = 12.01)
$d/f = 0.58$ (f = 12.01)

Example 7
$F = 5.69$ mm, $F_{NO} = 0.51$, $\omega = 6.3°$

| | | |
|---|---|---|
| $r_1 = 3.5706 \times 10^4$ (DIFFR.SF) | $d_1 = 0$ | $n_{900.1} = 1533$ |
| $r_2 = \infty$ | $d_2 = 2.000$ | $n_{900.2} = 1.48536$ |
| $r_3 = \infty$ | $d_3 = 0$ | $n_{900.3} = 1533$ |
| $r_4 = -3.5706 \times 10^4$ (DIFFR.SF) | $d_4 = 7.197$ | $n_{900.4} = 1.54000$ |
| $r_5 = 2$ | $d_5 = 3$ | |
| $r_6 = \infty$ (L.E.D.) | | |

Aspherical Coefficients

1st surface $K = 0$
$A_4 = -4.8205 \times 10^{-7}$
$A_6 = -3.0224 \times 10^{-9}$
$A_8 = -1.5323 \times 10^{-11}$
$A_{10} = 0$ 4th surface $K = 0$
$A_4 = -5.5792 \times 10^{-7}$
$A_6 = 1.4395 \times 10^{-9}$
$A_8 = 6.2525 \times 10^{-12}$
$A_{10} = 0$
$d/\phi = 0.16$ ($\phi = 12.44$)

Example 8
$F = 5.69$ mm, $F_{NO} = 0.51$, $\omega$ 5.2°

| | | |
|---|---|---|
| $r_1 = 1.1490 \times 10^4$ (DIFFR.SF) | $d_1 = 0$ | $n_{900.1} = 1533$ |
| $r_2 = \infty$ | $d_2 = 5.000$ | $n_{900.2} = 1.48563$ |
| $r_3 = \infty$ | $d_3 = 0$ | $n_{900.3} = 1533$ |
| $r_4 = 1.6888 \times 10^4$ (DIFFR.SF) | $d_4 = 2.505$ | $n_{900.4} = 1.54000$ |
| $r_5 = 2$ | $d_5 = 3$ | |
| $r_6 = \infty$ (L.E.D.) | | |

Aspherical Coefficients

1st surface $K = 0$
$A_4 = -1.9495 \times 10^{-7}$
$A_6 = 2.9607 \times 10^{-10}$
$A_8 = -5.9321 \times 10^{-12}$
$A_{10} = 0$ 4th surface $K = 0$
$A_4 = -1.4199 \times 10^{-6}$
$A_6 = 3.1942 \times 10^{-8}$
$A_8 = -4.3797 \times 10^{-10}$
$A_{10} = 0$
$d/\phi = 0.45$ ($\phi = 11.15$)
$d/f = 0.42$ (f = 12.00)

Example 9
$F = 5.69$ mm, $F_{NO} = 0.51$, $\omega = 5.7°$

| | | |
|---|---|---|
| $r_1 = -7.9543 \times 10^4$ (DIFFR.SF) | $d_1 = 0$ | $n_{900.1} = 1533$ |
| $r_2 = \infty$ | $d_2 = 2.000$ | $n_{900.2} = 1.48536$ |
| $r_3 = \infty$ | $d_3 = 0$ | $n_{900.3} = 1533$ |

-continued $r_4 = -1.5320 \times 10^4$ (DIFFR.SF)    $d_4 = 8.202$    $n_{900.4} = 1.54000$
$r_5 = 2$    $d_5 = 3$
$r_6 = \infty$ (L.E.D.)

Aspherical Coefficients

1st surface $K = 0$
$A_4 = -5.3129 \times 10^{-7}$
$A_6 = -2.0516 \times 10^{-9}$
$A_8 = 1.4635 \times 10^{-11}$
$A_{10} = 0$ 4th surface $K = 0$
$A_4 = -4.3773 \times 10^{-7}$
$A_6 = 2.0908 \times 10^{-9}$
$A_8 = 9.3391 \times 10^{-14}$
$A_{10} = 0$
$d/\phi = 0.15$   ($\phi = 13.44$)

Example 10

$F = 3.75$ mm, $F_{NO} = 1.1$, $f_B = 1.47$ mm, $\omega = 19.0°$ $r_1 = 2.91481$ (DIFFR.SF)    $d_1 = 0$    $n_{d1} = 1001$    $\nu_{d1} = -3.45$
$r_2 = 2.9150$    $d_2 = 3.8$    $n_{d2} = 1.49241$    $\nu_{d2} = 57.66$
$r_3 = -2.92907$    $d_3 = 0$    $n_{d3} = 1001$    $\nu_{d3} = -3.45$
$r_4 = -2.92989$ (DIFFR.SF)

Aspherical Coefficients

1st surface $K = 0$
$A_4 = -6.5307 \times 10^{-6}$
$A_6 = 2.7369 \times 10^{-6}$
$A_8 = -1.2910 \times 10^{-6}$
$A_{10} = 2.0098 \times 10^{-7}$ 4th surface $K = 0$
$A_4 = -2.0982 \times 10^{-5}$
$A_6 = 5.0215 \times 10^{-5}$
$A_8 = -2.2606 \times 10^{-5}$
$A_{10} = 3.2339 \times 10^{-6}$
$f_2/f = -2.79$   ($\phi = 3.75$)
$d/f = 1.01$   ($\phi = 3.75$)

Example 11

$F = 3.75$ mm, $F_{NO} = 1.2$, $f_B = 3.21$ mm, $\omega = 19.7°$ $r_1 = 6.9580 \times 10^3$ (DIFFR.SF)    $d_1 = 0$    $n_{d1} = 1001$    $\nu_{d1} = -3.45$
$r_2 = \infty$    $d_2 = 1.5$    $n_{d2} = 1.49241$    $\nu_{d2} = 57.66$
$r_3 = \infty$    $d_3 = 0$    $n_{d3} = 1001$    $\nu_{d3} = -3.45$
$r_4 = -6.9580 \times 10^3$ (DIFFR.SF)

Aspherical Coefficients

1st surface $K = 0$
$A_4 = -8.4522 \times 10^{-6}$
$A_6 = -2.2768 \times 10^{-7}$ -continued $A_8 = -1.1844 \times 10^{-7}$
$A_{10} = 0$ 4th surface $K = 0$
$A_4 = -1.1382 \times 10^{-5}$
$A_6 = 2.0246 \times 10^{-7}$
$A_8 = -2.0407 \times 10^{-8}$
$A_{10} = 0$
$d/\phi = 0.48$   ($\phi = 3.12$)

Aberration diagrams of Examples 1 to 11 are attached hereto as FIGS. 19(a)–29(d) wherein (a), (b), (c), and (d) show spherical aberration, astigmatism, distortion, and chromatic aberration of magnification, respectively.

As can be appreciated from the foregoing explanation, the present invention makes it possible to reduce the size of an optical element constructed of a single lens such as a lens element used for inexpensive phototaking lenses for cameras, and lenses for photometric devices, and so achieve an optical system having a reduced overall length.

What is claimed is:

1. A diffractive optical element wherein both surfaces thereof are constructed of diffractive surfaces, wherein said diffractive optical element comprises diffractive surfaces having positive power and negative power in order from a subject side thereof, said diffractive optical element satisfying the following condition (4):

$$0.2 < d/f < 1.5 \qquad (4)$$

where d is a center thickness of the diffractive optical element, and f is the focal length of the diffractive optical element.

2. A diffractive optical element wherein both surfaces thereof are constructed of diffractive surfaces, wherein both surfaces of said diffractive optical element have curvature, and said diffractive optical element comprises diffractive surfaces having positive power and negative power in order from a subject side thereof, said diffractive optical element satisfying the following condition (4):

$$0.2 < d/f < 1.5 \qquad (4)$$

where d is a center thickness of the diffractive optical element, and f is the focal length of the diffractive optical element.

* * * * *